United States Patent [19]

Paulus et al.

[11] Patent Number: 4,494,786
[45] Date of Patent: Jan. 22, 1985

[54] PIZZA OVEN TOOL

[75] Inventors: John R. Paulus; Marvin C. Keck, both of Wichita, Kans.

[73] Assignee: Pizza Hut, Inc., Wichita, Kans.

[21] Appl. No.: 516,791

[22] Filed: Jul. 25, 1983

[51] Int. Cl.³ .................. A47J 45/10; A47J 49/00
[52] U.S. Cl. .................................. 294/26; 294/9; 294/27 R
[58] Field of Search .............. 294/9, 10, 12, 14, 15, 294/19 R, 22-24, 26, 27 R, 28-33, 2; 16/114 A

[56] References Cited

U.S. PATENT DOCUMENTS

| | | | |
|---|---|---|---|
| 73,199 | 1/1868 | Roe | 294/30 |
| 806,889 | 12/1905 | Hamel | 294/32 |
| 850,983 | 4/1907 | Valiquette | 294/32 |
| 864,046 | 8/1907 | Trainham | 294/2 |
| 916,189 | 3/1909 | Pasino | 294/32 |
| 933,963 | 9/1909 | Edwards | 16/114 A |
| 1,004,312 | 9/1911 | Totty | 294/2 |
| 2,358,599 | 9/1944 | Schultz | 294/27 R |
| 2,571,943 | 10/1951 | Ray et al. | 294/26 |

FOREIGN PATENT DOCUMENTS 1487555 10/1977 United Kingdom .................. 294/26

Primary Examiner—Johnny D. Cherry
Attorney, Agent, or Firm—Willian, Brinks, Olds, Hofer, Gilson & Lione Ltd.

[57] ABSTRACT

The present invention is directed to a pizza oven utensil comprising generally a handle, a rod and a guiding element. The rod comprises a first end, a second end, a protrusion and a stop. The guiding element comprises an apex, a first leg having a first end and a second end, a second leg having a first end and a second end, and a concave base having an innermost portion. The first leg and the second leg abut one another at their respective first ends disposed at the apex. The concave base adjoins the first leg and the second leg at their respective second ends. The handle is disposed at the first end of the rod and the guiding element is disposed at the second end of the rod. In use, a pizza pan is inserted into or retrieved from a conveyor oven or a conventional deck oven with the aid of the pizza oven utensil of the present invention. The guiding element abuts a pizza pan when inserting it into the oven. At a preselected depth of insertion into the oven, the stop contacts a stop surface defined by the oven so that further insertion of the pizza pan into the oven is impeded. The guiding element engages with a lip of the pizza pan when retrieving it from the oven. The presnt invention provides a quick, safe and efficient method and apparatus for manipulating pizza pans in a variety of ovens.

11 Claims, 6 Drawing Figures

PIZZA OVEN TOOL

BACKGROUND OF THE INVENTION

The present invention is directed to a pizza oven tool incorporating means for inserting, retrieving and positioning pizza pans in conveyor and conventional deck ovens.

As deep-dish and stuffed pizzas gain ever increasing popularity, pizza chefs face an increasing range of problems in practicing their trade. Pizza chefs are now more than ever required to manipulate heavy pans in hot ovens. These heavy pans are difficult to manage and heat up to a high temperature very quickly. They pose a potential hazard of severe burns to pizza chefs. For example, the pizza pans in conventional ovens are often rotated through a series of positions during the cooking operation so that an evenly cooked product is obtained. Similarly, pizza pans in conveyor ovens are often inserted or retrieved in mid-cycle. Thus there exists a need for a safe method and apparatus for manipulating pizza pans in conveyor and conventional deck ovens.

Further, increasing business often requires that many pizzas be cooked in an oven at one time. This presents a problem of adequately positioning the pizza pans in the oven while hurrying to get the job done. Special care must be taken with the pizza pans placed in the back of the ovens. On the one hand, they must be placed as close to the back wall as is feasible in order to leave room for pizza pans to be placed in the middle and front portion of the oven. On the other hand, in order to ensure an even distribution of heat around the pizza pan and a correspondingly evenly cooked pizza, it is preferable that the pizza pan does not contact the back wall of the oven. It is especially important to avoid pushing the pizza pan too far into conveyor belt ovens, because the pan may get caught near the back wall of the oven with the result that the pizza may burn before completing its journey through the oven or interupt the progress of succeeding pizzas. Thus there exists a need for a method and apparatus for placing pizza pans in optimal positions towards the back of such ovens.

The preparation of personal size pan pizzas in conveyor ovens such as the Middleby-Marshall 220 and 250 ovens has presented further problems in the pizza industry. Small pizzas require less cooking time than large ones. As a result, personal size pan pizzas must be fed into the conveyor oven window opening near the start of the conveyor cycle and retrieved at the end of the conveyor cycle and/or they must be fed into the opening at the start of the cycle and retrieved the end of the cycle. The small pizzas only cook for about seventy-five percent (75%) as long as large pizzas. This requires that the pizza chef insert and retrieve pizzas via the conveyor oven side window which is hot, narrow and generally not at eye level. It is therefore particularly difficult to peer inside this side window, and as a result a tendency develops to feed the pizza pans into the oven in a haphazard manner.

The popularity of personal pan size pizzas, especially during peak lunch and dinner hours seems to be increasing. But if customers are kept waiting for a significant period of time, especially during their lunch hour, they are likely to turn to competing fast food services. In order to ensure quick service it is necessary to maintain close spacing between adjacent pizza pans so that a maximum number of pizzas can be cooked at one time. This is not possible when pizza pans are fed into the ovens in a haphazard manner. Thus, there exists a need for a method and apparatus that will provide a simple but organized manner of processing personal size pan pizzas in conveyor ovens so that customers can be served quickly during peak hours.

Finally, during peak hours, the rush to prepare pizzas often leads to increased risk of burns. This risk may be augmented by fatigue resulting from oven heat that can overcome the pizza chef who is required to peer into a hot oven while manipulating the pizza pans. There exists a need for a quick and efficient method and apparatus for performing these pizza cooking operations so that stress, fatigue and resulting accident risk can be minimized.

SUMMARY OF THE INVENTION

An important object of the present invention is to provide a pizza oven tool that can be used to push pizza pans into a hot conveyor or deck pizza oven while allowing the user to accurately control the movement of the pizza pan being pushed. According to this aspect of the invention, a pizza oven tool is provided comprising guiding means for pushing the pizza into the oven in a controlled manner.

A further object of the present invention is to provide a pizza oven tool that can be used to pull or reposition pans from a hot conveyor or deck pizza oven. According to this aspect of the invention, a pizza oven tool is provided wherein the means for pushing the pizza pan can also be used for pulling the pan.

Another object of the present invention is to provide a pizza oven tool which allows insertion of the pizza pan into the farthest optimal position in a conveyor or deck pizza oven, but which impedes further insertion into the oven. According to this aspect of the invention, a pizza oven tool is provided with stopping means that engage a stop surface. The stop surface may comprise either the top of the oven when used in conveyor ovens or the oven shelf when used in conventional deck ovens. The engagement of stopping means with the stop surface provided by the appropriate part of the oven occurs when the pizza pan is positioned correctly in the back of the oven and this engagement prevents the pizza pan from being inserted further. This aspect of the invention is particularly useful in conveyor ovens because it avoids the situation where a pizza pan is pushed too far into the oven such that it gets caught near the back wall and fails to move with the conveyor belt.

A still further object of the present invention is to provide a versatile tool that facilitates quick and efficient processing of pizza pans in a variety of ovens. According to this aspect of the invention, the aspects outlined above in combination produce this result.

Yet another object of the invention is to increase safety in the pizza making operation. According to this aspect of the invention, a pizza oven tool is provided with means to insert, position and retrieve pizza pans from an oven without requiring the user to gaze deeply into the oven. This reduces the risks of fatigue and concomitant carelessness, and thereby increases safety. Further, the arms and hands of the user need not approach the oven beyond the task of placing the pizza pan on the outermost portion of the oven shelf.

In summary, the present invention offers a quick, safe and efficient method and apparatus to insert, retrieve and position pizza pans in conveyor or deck ovens.

DETAILED DESCRIPTION OF THE PRESENTLY PREFERRED EMBODIMENT

Figure 1:
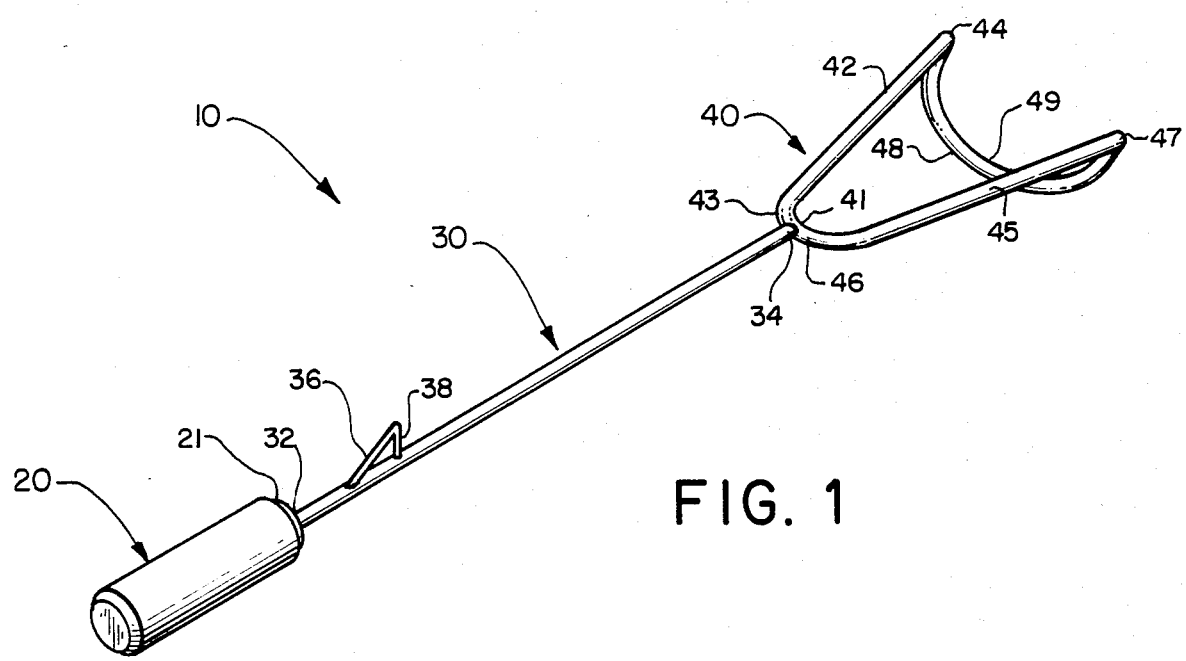
FIG. 1 shows a perspective view of the presently preferred embodiment of the pizza oven tool of the present invention.
Figure 2:
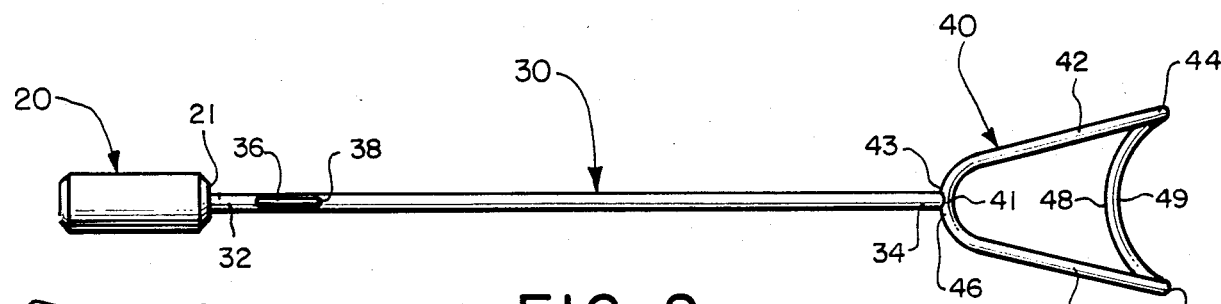
FIG. 2 shows a plan view of the pizza oven tool of FIG. 1.

Turning now to the drawings, FIG. 1 shows a perspective view of a presently preferred embodiment of the pizza oven utensil 10 of the present invention. As may be seen from FIG. 1, the pizza oven utensil 10 comprises generally a handle 20, a rod 30, and guiding means 40.

The handle 20 is preferably constructed of hard wood, but it may be constructed of any heat-resistant material.

The rod 30 comprises a first end 32, a second end 34, a protrusion 36 and a stop 38. The rod 30 is connected to the handle 20 at the first end 32 of the rod 30. The protrusion 36 is defined by the rod 30 between the first end 32 and the second end 34, and the protrusion 36 defines the stop 38. The protrusion 36 and the stop 38 are disposed at a pre-selected distance from the second end 34. This distance will depend upon the type of oven intended for use as well as upon the size of the pizza pan for which use of the oven utensil is primarily contemplated.

The guiding means 40 is defined by the second end 34 of the rod 30. The guiding means 40 adjoins the rod 30 at an apex 41. A first leg 42 and a second leg 45 extend from the apex 41 at an angle of about 120° in the preferred embodiment. The rod 30, the first leg 42, and the second leg 45 together define a plane. The first leg 42 further defines a first end 43 and a second end 44. Similarly, the second leg 45 defines a first end 46 and a second end 47. The first end 43 of the first leg 42 and the first end 46 of the second leg 45 abut one another at the apex 41. The second end 44 of the first leg 42 is disposed at a distance of approximately six inches from the second end 47 of the second leg 45 in the presently preferred embodiment of the invention. The presently preferred embodiment of the invention is specifically tailored to accomodate personal size pizza pans, but the dimensions may be varied when pizza pans of another size are to be in primary use.

A concave base 48 extends from the second end 44 of the first leg 42 and the second end 47 of the second leg 45. In the preferred embodiment of this invention, the concave base 48 extends at an angle of about 15° to the plane including the first leg 42, the second leg 45, and the rod 30. The concave base 48 defines an innermost portion 49 that extends about one half inch below the plane.

Figure 3A:
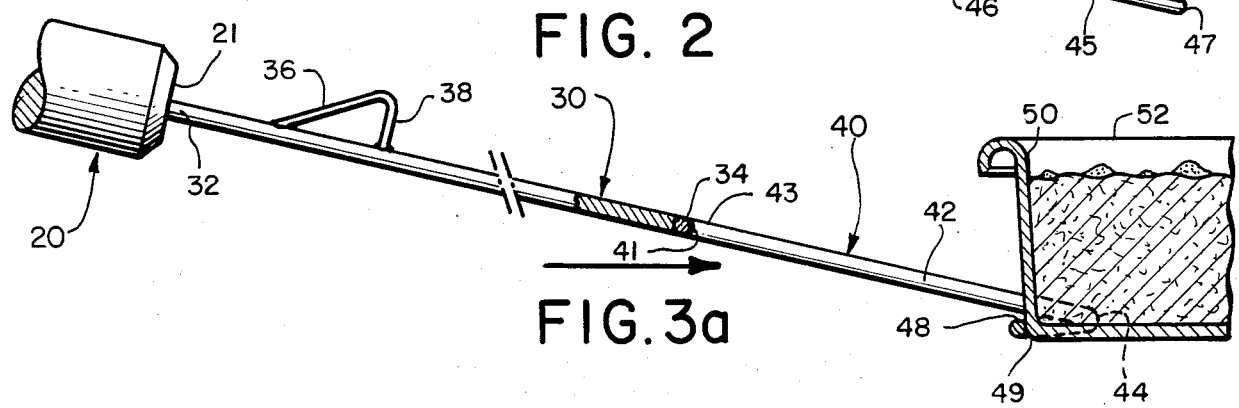
FIGS. 3a and 3b show a cross-sectional view of the pizza oven tool of FIG. 1 pushing and pulling a pizza pan.
Figure 3B:
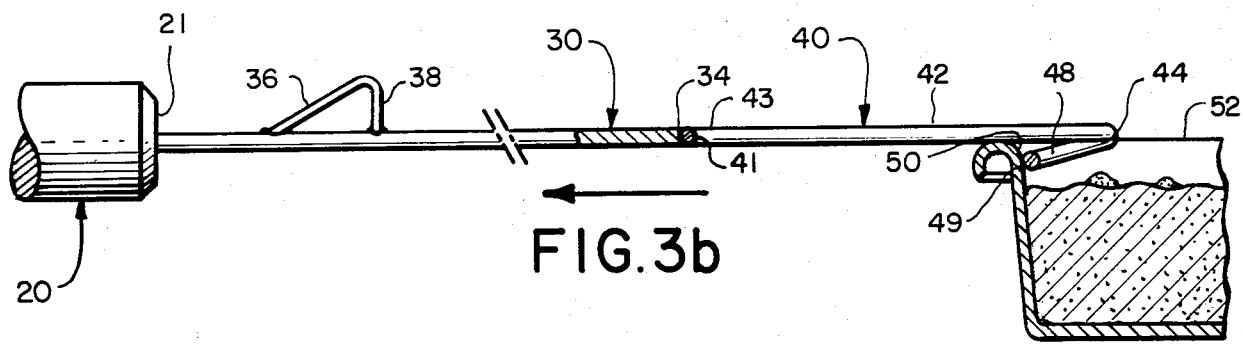

As best seen in FIG. 3a, the guiding means 40 engages with the outside of a pizza pan 52 when pushing it into an oven. As best seen in FIG. 3b, the innermost portion 49 of the concave base 48 hooks over a rim 50 of the pizza pan 52 when it is desired to pull the pizza pan 52 out of the oven.

Figure 4:
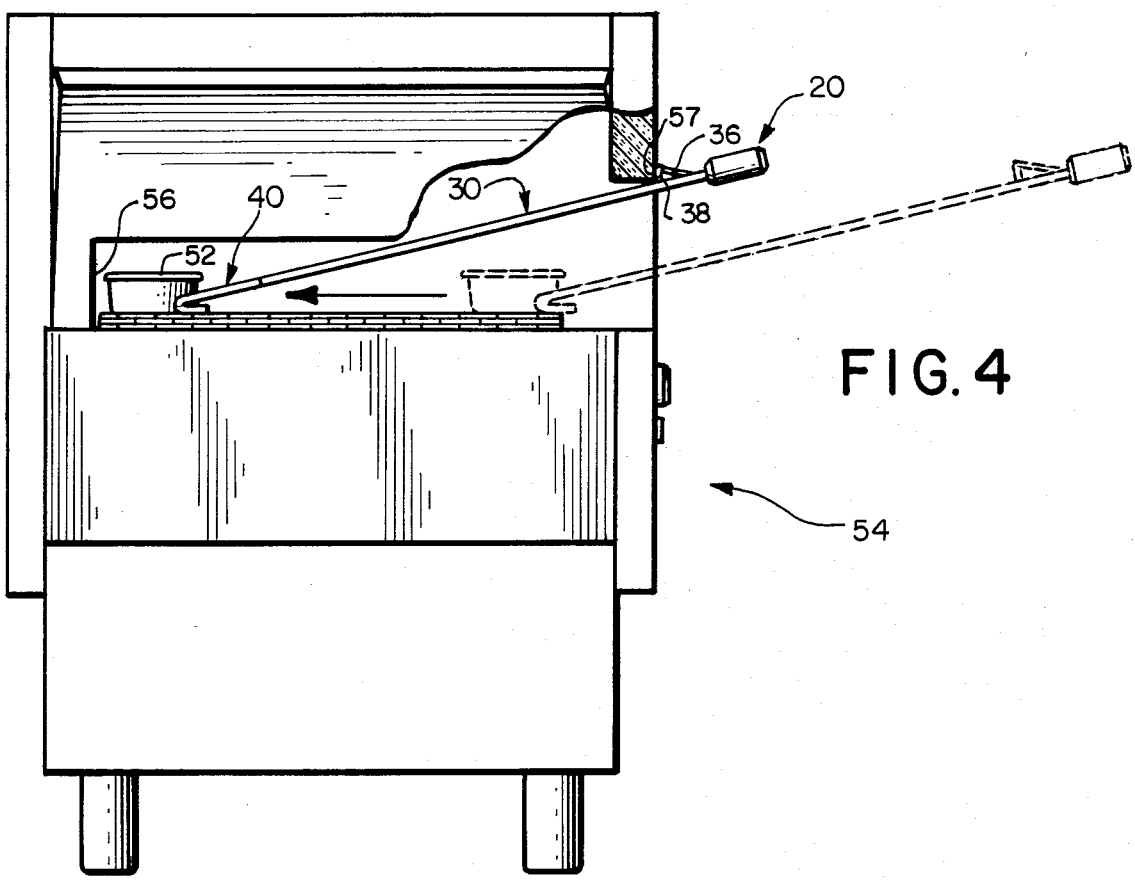
FIG. 4 shows a cross-sectional view of the pizza oven tool of FIG. 1 where the stop of the pizza oven tool is engaging the oven front stop surface of a conveyor oven.

FIG. 4 shows the pizza oven utensil 10 of the present invention being used in a conveyor oven 54 having a back wall 56 and defining an oven front stop surface 57. In use, the guiding means 40 abuts the outside of the pizza pan 52. The user pushes on the handle 20 such that the guiding means 40 causes the pizza pan 52 to slide into the conveyor oven 54 towards the back wall 56. The stop 38 defined by the protrusion 36 limits the degree of insertion of the pizza pan 52 into the oven 54. When the pizza pan 52 reaches a preselected position in the conveyor oven 54, about one and one half inches from the back wall 56, the stop 38 of the pizza oven utensil 10 engages with the oven front stop surface 57. It is therefore not necessary to attempt to peer into the hot oven 54 when using this pizza oven utensil 10.

Figure 5:
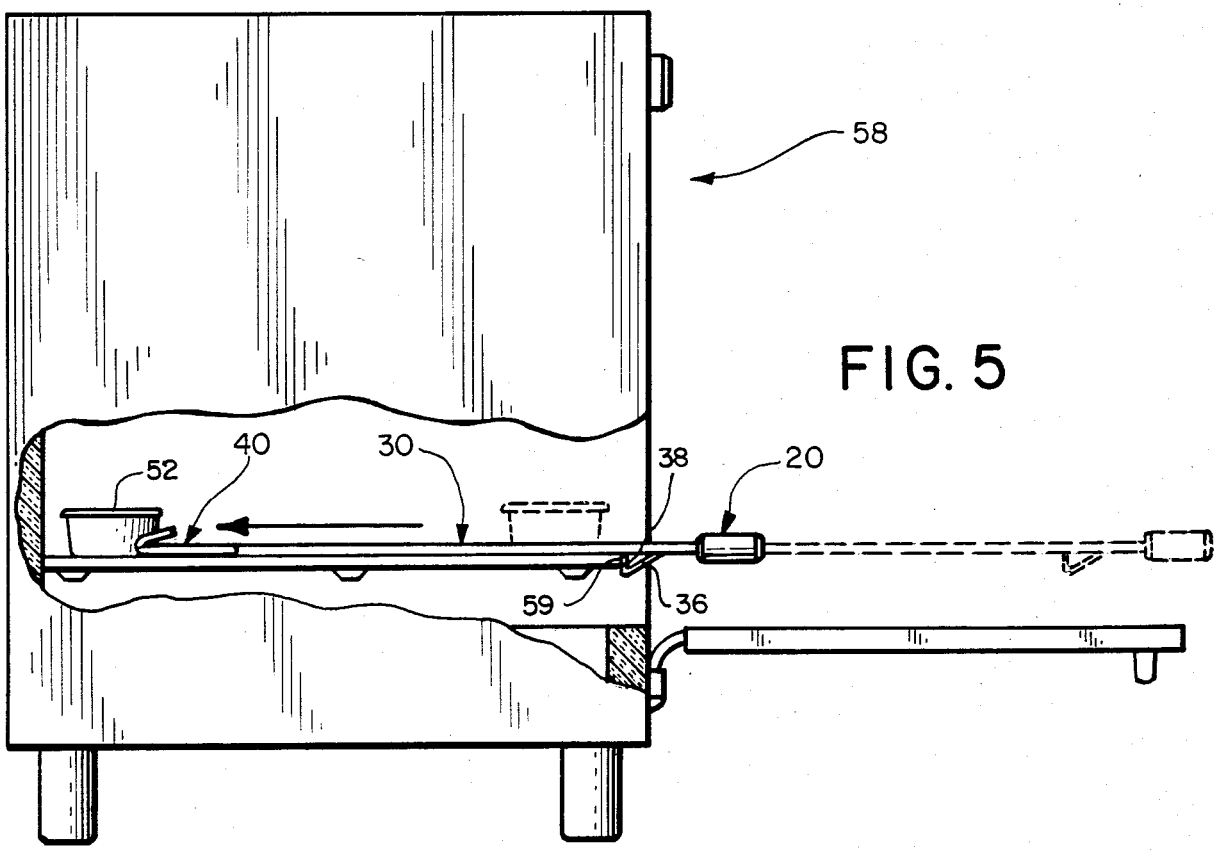
FIG. 5 shows a cross-sectional view of the pizza oven tool of FIG. 1 where stop of the pizza oven tool is engaging the oven shelf stop surface of a conventional deck oven.

FIG. 5 shows the pizza oven utensil 10 of the present invention being used to push a pizza pan 52 into a deck oven 58 defining a shelf stop surface 59. In the deck oven 58, the pizza oven utensil 10 of the present invention may be used in the same orientation as shown in FIG. 4 with the protrusion 36 disposed above the plane defined by the rod 30, the first leg 42 and the second leg 45, or if the stopping action is desired the orientation should be inverted such that the protrusion 36 is disposed below said plane as shown in FIG. 5. The pizza pan is pushed into the oven 58 until the stop 38 comes into contact with the shelf stop surface 59.

The function of this pizza oven utensil 10 has here been described in terms of pushing and pulling pizza pans. Of course, a combination of pushing and pulling pizza pans is useful in manipulating pizza pans within deck ovens. As has been mentioned, it is necessary for the pizza pans cooking in deck ovens 58 to be rotated to various positions throughout the oven 58. The pizza oven utensil 10 of the present invention is very useful for this purpose. Overall, the pizza oven utensil 10 of the present invention provides a quick, efficient and safe method and apparatus for manipulating pizza pans in a variety of ovens.

In the presently preferred embodiment of the invention the rod 30 is constructed of one quarter inch diameter type 304 stainless steel, about 26 inches in length from the first end 32 of the rod 30 at a first end 21 of the handle 20 to the second end 34 of the rod 30 at the apex 41. The rod 30 may extend at the first end 32 about an additional three inches through the handle 20. The protrusion 36 is heli-arc welded to the rod 30 and is constructed of one eigth inch diameter type 304 stainless steel rod. The protrusion 36 is disposed along about two and one quarter inches of the rod 30. The stop surface 38 is disposed at a distance of about four inches from the handle 20, about twenty-nine and one half inches from the apex 41, and about twenty-seven and one half inches to twenty-seven and three quarter inches form the innermost portion 49 of the concave base 48.

The handle 20 is preferably about five inches in length and has a diameter of about one and one half inches. A one eighth inch diameter spring pin may be inserted through the handle 20 and the rod 30 when the rod 30 extends about an additional three inches through the handle 20.

The first leg 42 and the second leg 45 adjoin the concave base 48 at a distance of about seven and four tenths inches from the apex 41, measured along the direction of the length of the rod 30. The first leg 42 and the second leg 45 may be constructed from one quarter inch diameter type 304 stainless steel rod and heli-arc welded to the rod 30 at the apex 41. The concave base 48 may be heli-arc welded to the first leg 42 at the second end 44 and the second leg 45 at the second end 47. Alternatively, the rod 30 and guiding means 40 may be constructed from a single rod of one quarter inch diameter type 304 stainless steel with a twist or single welded joint at the apex 41. All welded joints should be ground smooth and the color should be restored to all heli-arc welded areas by de-gousing. The concave base 48 has a radius of curvature of about three and three tenths inches. The distance from the innermost portion 49 of the concave base 48 to the second end 44 of the first leg 42 and the second end 47 of the second leg 45 is about one and nine tenths inches, measured along the direction of the length of the rod 30. The distance from the innermost portion 49 of the concave base 48 to the apex 41 is about five and six tenths inches from the apex 41, measured along the direction of the length of the rod 30.

The handle 20 may be constructed with a one eighth inch bevel from 30° to 45° at the first end 21 of the handle 20 and a second end 22 of the handle 20. The first leg 42 at the second end 44 and the second leg 45 at the second end 47 may be ground back so that sliding is facilitated when the pizza oven utensil 10 is used in a conventional deck oven 58 in the orientation shown in FIG. 5.

This preferred embodiment of this invention has a number of advantages. For example, pizza oven utensil 10 described herein offers the advantage of substantial versatility. It is ideally suited for inserting, retrieving and manipulating personal size pizza pans in conveyor ovens. The utensil 10 will not easily get caught in a conveyor chain, and the dimensions here set forth will allow the pizza pans 52 to be placed in an optimal position with respect to the back wall 56 of Middleby-Marshall 220 and 250 ovens. The pizza oven utensil 10 described herein can also perform the functions of inserting, retrieving and manipulating pizza pans of a variety of sizes in a variety of ovens. For example, it has also been found suitable for manipulating large pizza pans in conventional deck ovens. In addition to its versatility, the utensil 10 also provides the advantages of increased safety, speed and efficiency when used in the method described herein.

It should be understood that the present invention is not limited to the precise structure described above. Rather, a wide range of modifications can be made to this pizza oven utensil without departing from the spirit of the invention. For example, the guiding means 40 need not be inclined at an angle of about 15° to the plane including the first leg 42 and the second 45, so long as it is capable of both inserting and retrieving the pizza pan 52 from the ovens 54 or 58. Further, the handle 20 may itself serve the function of the stop 38, such that it is not necessary to include the protrusion 36 defining the stop 38. In addition, materials, details of construction and dimensions can be varied as needed to suit individual applications. It is therefore intended that the foregoing detailed description be regarded as illustrative rather than limiting, and that it be understood that it is the following claims, including all equivalents, which are intended to define the scope of this invention.

We claim:

1. A pizza oven utensil for manipulating pizza pans having a base and a side wall depending upwardly from the base and defining an upper rim, comprising:

a handle constructed of a heat resistant material; a rod having a first end connected to the handle and a second end;

guiding means, defined by the second end of the rod, for pushing the pizza pans into an oven by abutting the side walls of the pizza pans and for pulling the pizza pans out of the oven in a controlled manner by engaging the rims of the pizza pan inwardly of the side walls; and stopping means, defined by the rod, for externally positioning the second end of the rod in the oven, such that when the pizza pans are pushed a preselected distance into the oven the stopping means is effective to impede further insertion of the pizza pans in the oven.

2. The pizza oven utensil of claim 1 wherein the guiding means comprises a closed three sided projection from the second end of the rod, having an apex, a first leg, a second leg, and a concave base, where the apex is disposed at the second end of the rod, the first leg and the second leg extend at an angle of about 120° from the apex in a plane including the rod, and the concave base has a first end adjoining the first leg and a second end adjoining the second leg and extends below the plane defined by the first and second legs.

3. The pizza oven utensil of claim 2 wherein the base is inclined at an angle of about 15° to the plane defined by the first and second legs and has an innermost portion that extends about one half inch below said plane.

4. The pizza oven utensil of claim 1 wherein the stopping means comprises a protrusion in the rod disposed at a preselected distance from the second end, said protrusion extending at least one inch above the rod.

5. A pizza oven utensil, comprising:

a handle constructed of a heat resistant material;

a rod having a first end connected to the handle and a second end;

guiding means, defined by the second end of the rod, for pushing a pizza pan into an oven and pulling the pizza pan out of the oven in a controlled manner comprising a closed three sided projection from the second end of the rod, having an apex, a first leg, a second leg, and a concave base, where the apex is disposed at the second end of the rod, the first leg and the second leg extend at an angle of about 120° from the apex in a plane including the rod, and the concave base is inclined at an angle of about 15° below the plane defined by the first and second legs, has an innermost portion that extends about one half inch below said plane and has a first end adjoining the first leg and a second end adjoining the second leg, wherein the first end of the concave base is disposed at a distance not to exceed six inches from the second end of the concave base; and stopping means, defined by the rod, for externally positioning the second end of the rod in the oven, such that when the pizza pan is pushed a preselected distance into the oven the stopping means is effective to impede further insertion of the pizza pan in the oven, wherein the stopping means is disposed at distance of about twenty-seven and one half to twenty-seven and three quarter inches from the innermost portion of the concave base.

6. The pizza oven utensil of claim 5 wherein the handle is a five inch wooden handle and wherein the distance from the handle to the stopping means is about four inches.

7. A pizza oven utensil, comprising:
a handle constructed of a heat resistant material;
a rod having a first end connected to the handle and a second end defining an apex, a first leg, a second leg and a concave base, where the first leg and the second leg define an angle of about 120° at the apex and define a plane including the rod, and the concave base has a first end adjoining the first leg, a second end adjoining the second leg, and an innermost portion extending about one half inch and 15° below the plane defined by the first and second legs; and
a stop protruding from the rod at a distance of about twenty-seven and three quarter inches from the innermost portion of the concave base.

8. The pizza oven utensil of claim 7 wherein the handle is a five inch wooden handle and wherein the distance from the handle to the stop is about four inches.

9. The pizza oven utensil of claim 7 wherein the first end of the concave base is disposed at a distance of about six inches from the second end of the concave base.

10. A method for inserting a pizza pan into a conveyor oven having a cooking surface adjacent to a stop surface defining a front opening, said method comprising:

providing a pizza oven utensil having a handle constructed of a heat resistant material, a rod having a first end connected to the handle and a second end defining guiding means, and stopping means defined by the rod;
inserting the pizza pan through the front opening;
placing the pizza pan on the cooking surface;
engaging the guiding means with the pizza pan so that the stopping means project in an upward direction; and
pushing the second end of the rod into the oven until the stopping means engages with the stop surface, such that the pizza pan slides into a preselected position in the oven.

11. A method for inserting a pizza pan into a deck oven defining a front opening and having a shelf defining a stop surface adjacent to the front opening, said method comprising:
providing a pizza oven utensil having a handle constructed of a heat resistant material, a rod having a first end connected to the handle and a second end defining guiding means, and stopping means defined by the rod;
inserting the pizza pan through the front opening;
placing the pizza pan on the shelf;
engaging the guiding means with the pizza pan so that the stopping means project in a downward direction;
sliding the second end of the rod into the oven until the stopping means engages with the stop surface defined by the shelf, such that the pizza pan slides into a preselected position in the oven.

* * * * *